[12] United States Patent  
Garbow et al.

(10) Patent No.: US 7,668,922 B2  
(45) Date of Patent: Feb. 23, 2010

(54) IDENTIFYING AND DISPLAYING RELEVANT SHARED ENTITIES IN AN INSTANT MESSAGING SYSTEM

(75) Inventors: Zachary Adam Garbow, Rochester, MN (US); Misky Halimo Hillestad, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 632 days.

(21) Appl. No.: 11/335,796

(22) Filed: Jan. 19, 2006

(65) Prior Publication Data

US 2007/0168448 A1  Jul. 19, 2007

(51) Int. Cl.
*G06F 15/16* (2006.01)
(52) U.S. Cl. .................. 709/207; 709/204; 709/205
(58) Field of Classification Search ......... 709/200–207, 709/217–227, 228–203; 707/1–3
See application file for complete search history.

(56) References Cited

U.S. PATENT DOCUMENTS

| | | | | |
|---|---|---|---|---|
| 6,230,171 | B1 * | 5/2001 | Pacifici et al. | 715/201 |
| 6,240,444 | B1 * | 5/2001 | Fin et al. | 709/205 |
| 6,731,308 | B1 * | 5/2004 | Tang et al. | 715/751 |
| 6,791,583 | B2 * | 9/2004 | Tang et al. | 715/751 |
| 7,159,011 | B1 * | 1/2007 | Knight et al. | 709/207 |
| 7,529,796 | B2 * | 5/2009 | Riddle | 709/204 |
| 7,546,463 | B2 * | 6/2009 | Karabulut | 713/175 |
| 2001/0032240 | A1 * | 10/2001 | Malone et al. | 709/203 |
| 2006/0259473 | A1 * | 11/2006 | Li et al. | 707/3 |

OTHER PUBLICATIONS http://www.fiveacross.com/products/features.shtml, five across InterComm Features, Sep. 5, 2005.
Ximian Dashboard, Nat Friedman (nat@ximian.com, Jul. 25, 2003, pp. 1-4.
http://www.imeem.com/index.aspx, imeem connect with people, Dec. 15, 2005.
http://news.com.com/2102-1008 3-5110910.html?tag=st util print, "Microsoft aims for search on its own terms" by Michael Kanellos, pp. 1-4.
http://help.yahoo.com/us/sbc/tutorials/ms7/im_file1.html, "Sending: Drag and Drop Onto the IM Window", Sep. 26, 2005, pp. 1-3.
http://help.yahoo.com/us/sbc/tutorials/ms7/im_file4.html, "Sending: Drag and Drop Onto a Contact Name", Sep. 26, 2005, pp. 1-4.
http://www.nat.org/dashboard/, "The Dashboard", Dec. 15, 2005.

* cited by examiner

*Primary Examiner*—Moustafa M Meky
(74) *Attorney, Agent, or Firm*—Wood, Herron & Evans LLP (57) ABSTRACT

An apparatus, program product and/or method identify relevant shared entities and/or display shared entities in an instant messaging system. In particular, entities such as files, images, videos, e-mails, links, bookmarks, databases, transcripts of other instant messages, etc. that are shared between users participating in an instant message session may be identified and highlighted to indicate that the shared entities are related to the instant message session. Furthermore, a link to an entity may be sent to a user when the entity is referenced in an instant message of the instant message session. Additionally, a display representation of entities that are shared with a user may be displayed in the user's buddy list to indicate that the shared entity is accessible to the user and whom shared the entity with the user. Furthermore, a transcript may be associated with an entity.

22 Claims, 7 Drawing Sheets

IDENTIFYING AND DISPLAYING RELEVANT SHARED ENTITIES IN AN INSTANT MESSAGING SYSTEM

FIELD OF THE INVENTION

The invention relates to computers and computer systems, and in particular, to identifying and displaying shared entities in an instant messaging system.

BACKGROUND OF THE INVENTION

The Internet has profoundly changed many aspects of contemporary society, and has become an increasingly important resource for numerous educational, entertainment and commercial purposes. The Internet generally facilitates information exchange between users, thus, e-mailing and instant messaging have become popular forms of communication, both for personal and business use.

In particular, instant messaging systems typically permit users, whom are logged into the same instant messaging system, to send and receive instant messages to and from each other in realtime. An instant message, which may also be referred to as a chat message, is generally a communication sent by one user to one or more other users. An instant messaging system generally handles the exchange of instant messages, and typically supports the ability to display an instant messaging window incorporating a running transcript of the ongoing chat between the participating users on each user's computer screen.

An instant messaging window typically includes an area where the instant messages already sent by users participating in the chat are displayed as well as an area where an instant message a user wants to send, which is usually text typed by a user from a keyboard, may be displayed before the user sends the instant message to the other users participating in the chat. Furthermore, in addition to instant messaging or chatting, instant messaging systems may also be used to share files, images, etc. with others. By sharing, the files are made accessible to participants that did not previously have access to the files. Additionally, the transcript or log of the chat (i.e., record of the instant messages sent and/or received by users participating in a chat) may be stored so that the users may refer back to the transcript at later time and/or date.

Furthermore, a buddy list may also be displayed for users. Generally, each user indicates the screen names (i.e., aliases) of users of the instant messaging system that he or she regularly interacts with (e.g., screen names of friends, family, work colleagues, etc.), and the screen names of those users that are currently logged on to the instant messaging system are displayed in the buddy list. In some designs, buddies who are not currently online are also displayed in the buddy list, with the online buddies highlighted in the list to indicate their online status.

Instant messaging systems are typically implemented via a client-server environment or a peer-to-peer environment. In the former, each user may login to an instant messaging server via their instant messaging client. The instant messaging server authenticates the login information, generates the user's buddy list, and facilitates the exchange of instant messages between users. Thus, the instant messaging server generally functions as an intermediary and passes instant messages between the users. The peer-to-peer environment may also include an instant messaging server for user login as well as a central user database. In the peer-to-peer environment, the instant messaging server initially functions as an intermediary and then the instant messages may be transmitted directly between the users via their instant messaging clients.

One problem that a user may encounter when participating in a conversation via instant messaging occurs when either user needs to locate information such as files that have been previously shared among the participants related to the subject matter of the conversation. For example, while chatting with a work colleague about a project, the user may realize that some files previously shared between the parties may be relevant to the project, therefore, the user may have to search through his or her file system, e-mail inbox, e-mail sent folder, and/or other depositories to identify those relevant shared files that are related to the project. Yet, the user may not have enough time to identify those shared files or may disregard some shared files that may be relevant (e.g., a shared file has a misleading title and may be overlooked), thus, interrupting the conversation and reducing the user's productivity.

Furthermore, when relevant shared files are identified by a user and the user brings the shared files to another chat participant's attention (e.g., by referencing the shared files in an instant message to the other chat participant), the other chat participant may also have to spend time manually locating the identified shared files in his or her depositories (e.g., file system, e-mail inbox, etc.). On the other hand, in some systems, the user may once again share the previously shared file with the other chat participant. Nonetheless, the productivity of the user and/or other chat participant may be further hindered by either approach.

Also, the growth of information sharing via instant messaging has generally increased the difficulty of organizing shared information. Users generally have to manually organize shared information, which is not particularly efficient. For example, information including files may be shared with a user via instant messaging by different individuals (e.g., screen names of friends, family, work colleagues, etc.) on different dates for different projects in different formats (e.g., images, links, text documents, spreadsheets, presentations, etc.). Organizing information with such varied qualities is not generally intuitive and has resulted in an organization that does not reflect the nature of the shared information, (e.g., which files were shared with the user, who shared which file with the user, which files the user shared with others, whom did the user share a particular file with, etc.). Similarly, transcripts of chats may be organized in chronological order or manually, thus, the organization of the transcripts may also not reflect the nature of the transcript (e.g., the discussions of the chat).

A need therefore exists in improving instant messaging systems, in particular, an improved manner of identifying relevant shared information and referencing relevant shared information, and an improved manner of organizing shared information and transcripts, which generally reduces the burden on users.

SUMMARY OF THE INVENTION

The invention addresses these and other problems associated with the prior art by providing an apparatus, program product and method that identify and highlight entities such as files, images, videos, e-mails, links, bookmarks, databases, transcripts of other instant message sessions, etc. that are relevant because they are shared by users participating in an instant message session. In particular, embodiments consistent with the invention may identify at least one relevant entity from among a plurality of entities based upon the relevant entity being shared by first and second users participating in the instant message session and highlight a display representation of the relevant entity to indicate that the relevant entity is related to the instant message session. As such, a user is assisted in quickly and reliably determining shared entities that may be related to a particular instant message session in which the user is participating.

Furthermore, in some embodiments consistent with the invention, at least one instant message of the instant message session between a first user and a second user may be analyzed to identify a reference to a second relevant entity, which may be shared or unshared, in the instant message and the identified reference in the instant message may be replaced with a link to the second relevant entity. As such, a user is assisted in quickly and reliably accessing shared entities that are referenced in an instant message session in which the user is participating. Moreover, users may be able to quickly initiate transfers of any unshared entities.

Additionally, embodiments consistent with the invention provide a method that associates transcripts of instant message sessions with entities referenced during the instant message sessions. In particular, at least one instant message of the instant message session between a first user and a second user may be analyzed to identify a reference to an entity and at least a portion of a transcript of the instant message session may be associated with the entity to indicate that the transcript of the instant message session is related to the entity. By doing so, users may spend less time manually organizing and locating transcripts of instant message sessions that are related to an entity, often resulting in productivity and efficiency gains.

Furthermore, embodiments consistent with the invention provide a method that relies upon buddy lists to organize shared entities. In particular, a display representation of a shared entity may be displayed in a display representation of a buddy list of a second user in response to a first user sharing the entity with the second user via instant messaging to indicate to the second user the accessibility of the shared entity and the association of the shared entity with the first user. By doing so, users may spend less time manually organizing shared entities, often resulting in productivity and efficiency gains.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed hereinafter identify at least one relevant entity from among a plurality of entities based upon the relevant entity being shared by the users participating in an instant message session. Consistent with the invention, an entity may be practically any information such as a file (e.g., a text document, a spreadsheet, a presentation, etc.), an image, a video, an e-mail, a link, a bookmark, a database, a transcript of another instant message or session, etc. The plurality of entities may include entities from an inbox, entities from a file system, a combination of entities from an inbox and a file system, etc. Additionally, the relevance of each identified entity may be further based upon the analysis of at least one instant message of an instant message session (e.g., the entity is related to the content or context of the instant message). Furthermore, embodiments consistent with the invention also associate a transcript of an instant message session with an entity and/or display at least one shared entity in a buddy list.

Consistent with the invention, the term "instant message" herein may be at least a portion of a communication sent and/or received or capable of being sent and/or received by at least one user via an instant messaging system. An instant message may refer to more than one communication. Similarly, the term "chat" may also be at least a portion of one communication or more than one communication sent and/or received, or capable of being sent and/or received, by at least one user via an instant messaging system. The term "chat" may also refer to the receiving and/or sending of at least one communication or ability to send and/or receive at least one communication by two users as well as by more than two users. The term "instant message session" generally refers to the communications sent and/or received during a period of time.

Similarly, the terms "instant messaging" and "chatting" generally refer to sending and/or receiving a communication or ability to send and/or receive a communication. The terms "instant message", "chat", "instant message session", "instant messaging" and "chatting" are used interchangeably herein as they all generally refer to sending and/or receiving a communication. However, those of ordinary skill in the art should appreciate that by using them interchangeably the scope of none of the terms should be limited. Additionally, the term "instant messaging system" relates to the sending and/or receiving of an instant message a s well as the structure, features, and functionality that may be associated with sending and/or receiving an instant message.

Figure 1:
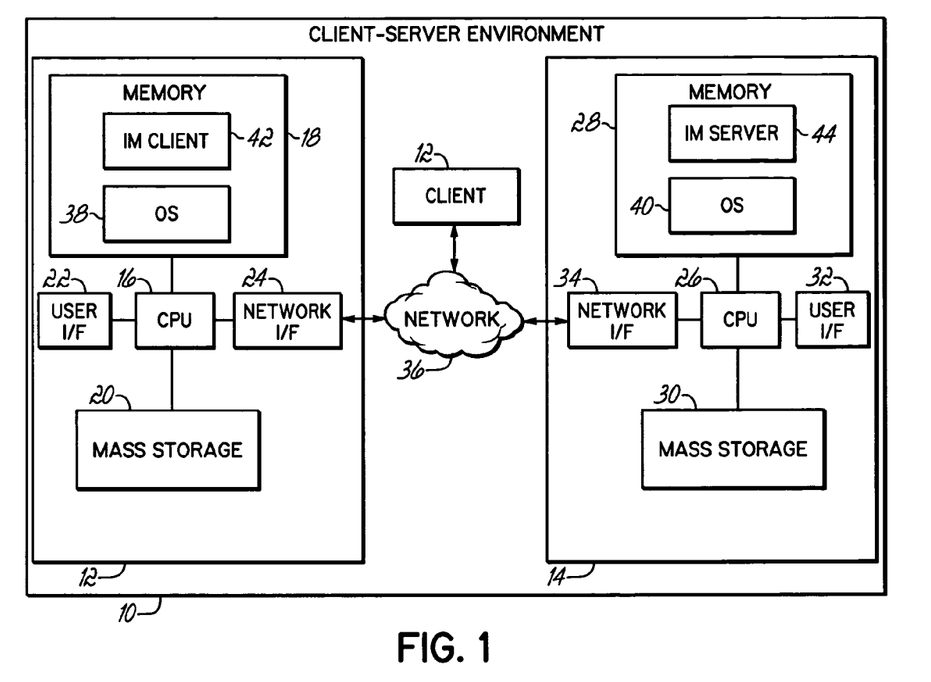
FIG. 1 is a block diagram of a client-server implementation of an instant messaging system consistent with the invention.

Turning now to the Drawings, wherein like numbers denote like parts throughout the several views, FIG. 1 illustrates a client-server based computer system or environment 10 consistent with the invention. In particular, the client-server computer system 10 may be part of an instant messaging system with the client computers 12 as instant messaging clients and the server computers 14 as instant messaging servers. System 10 includes at least one apparatus, e.g., one or more client computers 12 and one or more server computers 14. For the purposes of the invention, each computer 12, 14 may represent practically any type of computer, computer system or other programmable electronic device capable of functioning as a client and/or server in a client-server environment. Moreover, each computer 12, 14 may be implemented using one or more networked computers, e.g., in a cluster or other distributed computing system. Moreover, as is common in many client-server systems, typically multiple client computers 12 will be interfaced with a given server computer 14.

Computer 12 typically includes a central processing unit 16 including at least one microprocessor coupled to a memory 18, which may represent the random access memory (RAM) devices comprising the main storage of computer 12, as well as any supplemental levels of memory, e.g., cache memories, non-volatile or backup memories (e.g., programmable or flash memories), read-only memories, etc. In addition, memory 18 may be considered to include memory storage physically located elsewhere in computer 12, e.g., any cache memory in a processor in CPU 16, as well as any storage capacity used as a virtual memory, e.g., as stored on a mass storage device 20 or on another computer coupled to computer 12. Computer 12 also typically receives a number of inputs and outputs for communicating information externally. For interface with a user or operator, computer 12 typically includes a user interface 22 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, computer 12 may also include one or more mass storage devices 20, e.g., a floppy or other removable disk drive, a hard disk drive, a direct access storage device (DASD), an optical drive (e.g., a CD drive, a DVD drive, etc.), and/or a tape drive, among others. Furthermore, computer 12 may include an interface 24 with one or more networks (e.g., a LAN, a WAN, a wireless network, and/or the Internet, among others) to permit the communication of information with other computers and electronic devices. It should be appreciated that computer 12 typically includes suitable analog and/or digital interfaces between CPU 16 and each of components 18, 20, 22 and 24 as is well known in the art.

In a similar manner to computer 12, computer 14 includes a CPU 26, memory 28, mass storage 30, user interface 32 and network interface 34. However, given the nature of computers 12 and 14 as client and server, in many instances computer 14 will be implemented using a multi-user computer such as a server computer, a midrange computer, a mainframe, etc., while computer 12 will be implemented using a desktop or other single-user computer. As a result, the specifications of the CPU's, memories, mass storage, user interfaces and network interfaces will typically vary between computers 12 and 14. Other hardware environments are contemplated within the context of the invention.

Computers 12, 14 are generally interfaced with one another via a network 36, which may be public and/or private, wired and/or wireless, local and/or wide-area, etc. Moreover, network 36 may represent multiple, interconnected networks. In the illustrated embodiment, for example, network 36 may include the Internet.

Each computer 12, 14 operates under the control of an operating system 38, 40, and executes or otherwise relies upon various computer software applications, components, programs, objects, modules, data structures, etc. (e.g. instant messaging (IM) client 42 and instant messaging (IM) server 44). Moreover, various applications, components, programs, objects, modules, etc. may also execute on one or more processors in another computer coupled to computer 12, 14 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to tangible recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Figure 2:
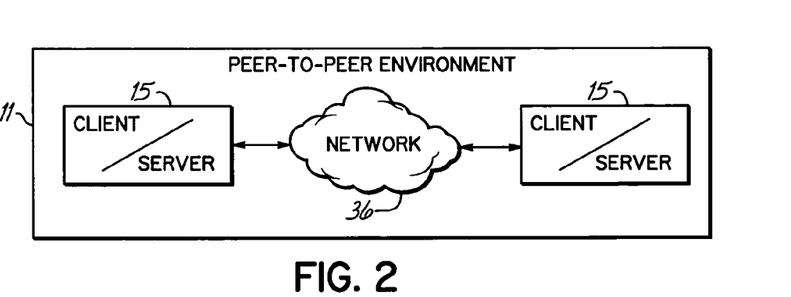
FIG. 2 is a block diagram of a peer-to-peer implementation of an instant messaging system that may be utilized as an alternative to the instant messaging system described in FIG. 1.

FIG. 2 generally illustrates a peer-to-peer based computer system or environment 11 that may be used consistent with the invention. In particular, the peer to peer based computer system 11 may include one or more peer computers 15 that may interface with one another via a network 36, which may be public and/or private, wired and/or wireless, local and/or wide-area, etc. Moreover, network 36 may represent multiple, interconnected networks. In the illustrated embodiment, for example, network 36 may include the Internet.

Each peer computer 15 may act as both a client 12 and a server 14 as generally described by like numbers in connection with FIG. 1. Additionally, a central server, such as server 14 of FIG. 1, may be used in the peer-to-peer environment 11 for central authentication and management. For instance, one or more peer computers 15 may interface with a central server for authentication, after the authentication, a peer computer 15 may interface directly with another peer computer 15 as illustrated in peer-to-peer environment 11. Peer-to-peer instant messaging architectures are known to those of ordinary skill in the art and practically any peer-to-peer instant messaging architecture may be used consistent with the invention.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention. For example, a combination of the client-server environment 10 and the peer-to-peer environment 11 may be used.

As noted above, embodiments consistent with the invention are generally configured to display a display representation of a shared entity in a display representation of a buddy list to indicate the accessibility of the shared entity and association of the shared entity with a particular individual whom shared the entity. Additionally, embodiments consistent with the invention are configured to identify relevant entities that are shared by the participants in an instant message session and highlight a display representation of relevant shared entities. Furthermore, embodiments consistent with the invention are configured to associate at least a portion of the transcript of an instant message session with entities (i.e., shared and/or unshared) referenced in the instant message session.

In the illustrated embodiments, an instant messaging system may be implemented within the client-server system 10 and/or peer-to-peer system 11. In the context of the invention, an instant messaging client 42 may generally be considered to include any program code resident on a computer or other programmable electronic device that is capable of making requests of another computer in a distributed computer system. Likewise, an instant messaging server 44 may generally be considered to include any program code resident on a computer or other programmable electronic device that is capable of servicing such requests in a distributed computer system. It should also be appreciated that an instant messaging server 44 in this context may be resident on the same computer as the instant messaging client 42, (e.g., in the peer-to-peer system 11 described hereinabove), or in the alternative, the server 44 may be resident on an intermediate computer coupled between the client(s). Additionally, instant messaging client 42 and instant messaging server 44 may be considered to include the hardware associated with each (e.g., client computer 12 and server computer 14, respectively) as well as the software (e.g., program code).

Figure 3:
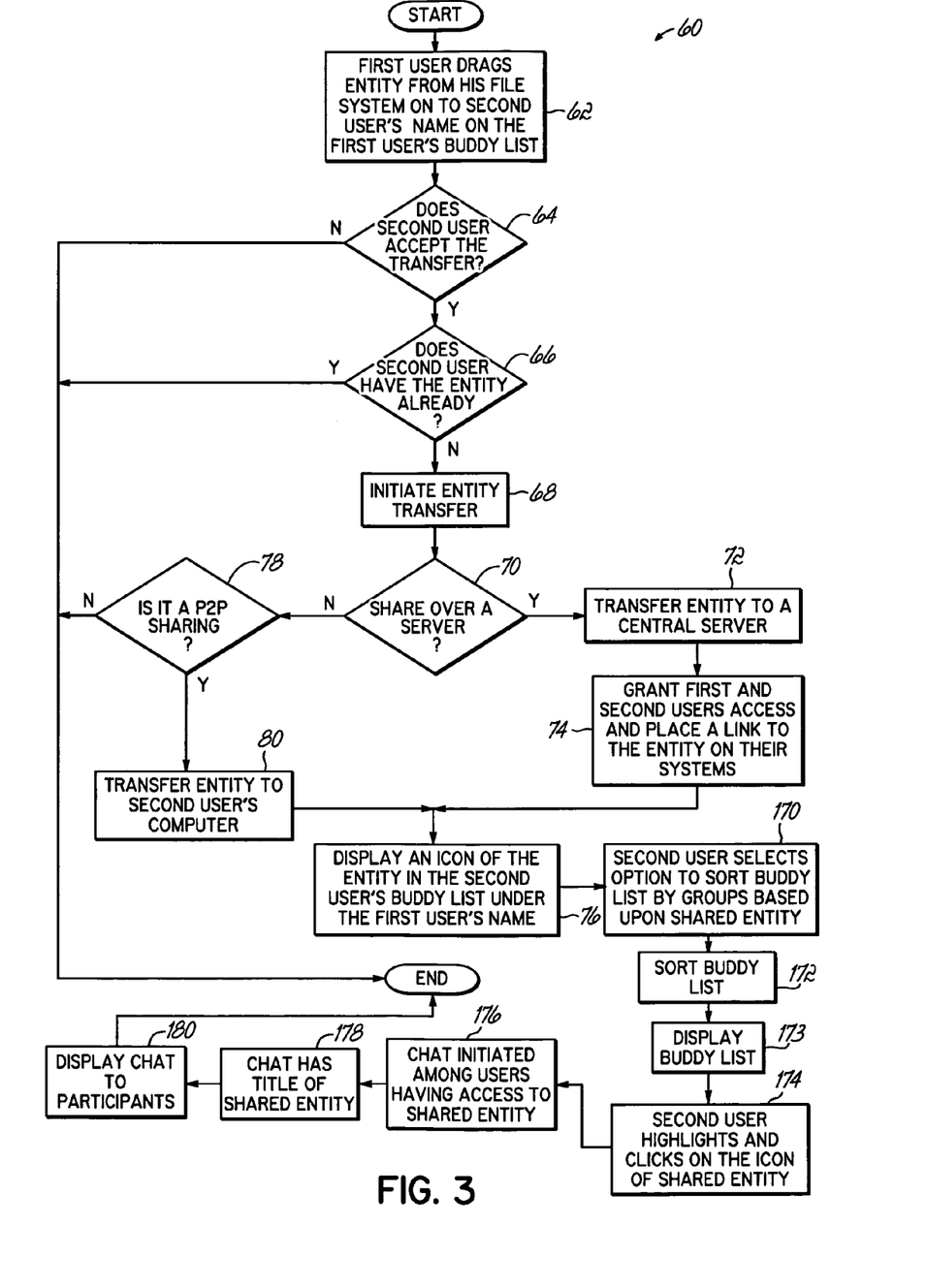
FIG. 3 is a flowchart of an entity sharing routine executed by the instant messaging system of FIG. 1.
Figure 4:
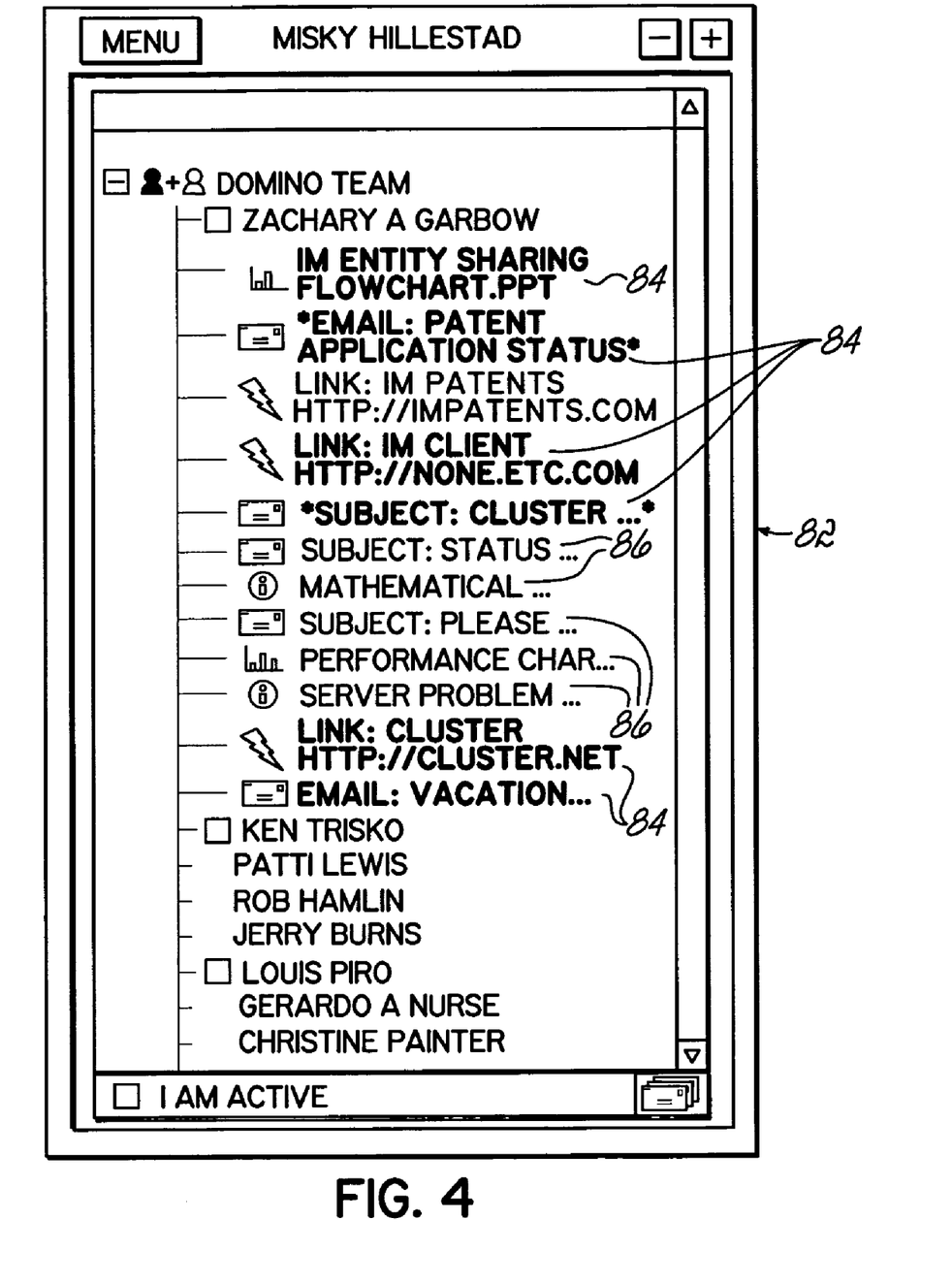
FIG. 4 is a block diagram of a buddy list generated by the routine of FIG. 3.
Figure 5:
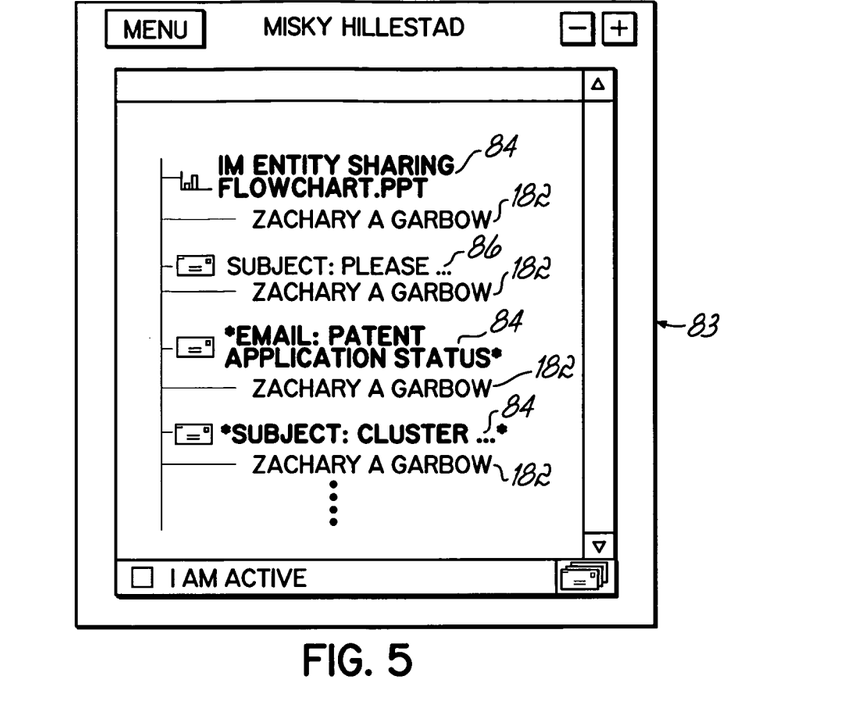
FIG. 5 is a block diagram of an alternative buddy list that may be generated by the routine of FIG. 3.
Figure 6:
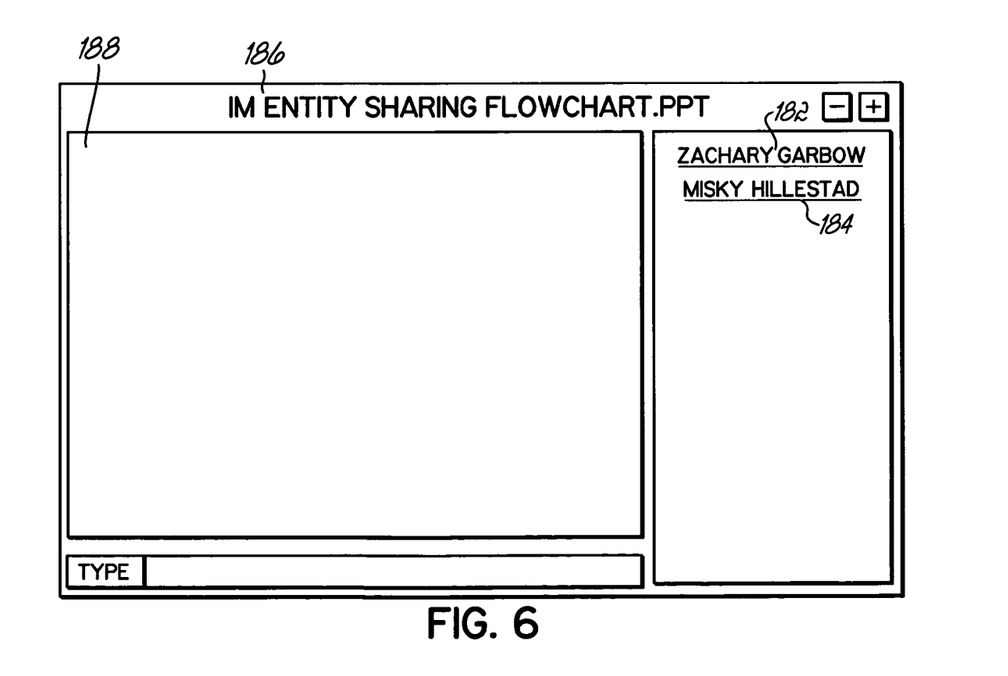
FIG. 6 is a block diagram of an exemplary instant messaging window that may be generated by the routine of FIG. 3.

Embodiments consistent with the invention provide a method that relies upon buddy lists to organize shared entities. Thus, FIG. 3 illustrates an exemplary entity sharing routine 60 consistent with the invention. FIG. 4 illustrates one display representation of a buddy list that may be displayed as a result of the execution of routine 60 of FIG. 3. FIG. 5 illustrates an alternative display representation of a buddy list that may be displayed as a result of the execution of routine 60 of FIG. 3. FIG. 6 illustrates one display representation of an instant messaging window that may be generated by the execution of routine 60 of FIG. 3.

Turning first to FIG. 3, in block 62, a first user drags a display representation of an entity he or she wants to share with a second user from the first user's file system, and drops the display representation of the entity into the second user's buddy list name or screen name in a display representation of the first user's buddy list on the first user's computer. Alternatively, a display representation of the entity may be dragged and dropped into a display representation of a chat between the first user and the second user. Although dragging and dropping entities that the first user wants to share with the second user typically reduces the number of steps, other techniques may be used as well. For instance, the display representation of the instant message may provide a menu button with an option to upload an entity to be shared.

Before the sharing of the entity is finalized, block 64 determines whether the second user accepts the transfer, i.e., sharing. For example, the second user may be presented with a prompt and the second user may accept or not accept the transfer (e.g., the second user may decline because he or she may not have enough memory resources). Alternatively, the second user may set his or her preferences to not permit transfers altogether or not permit them under certain conditions. Conditions may be based upon who can transfer entities to the second user, the amount of data that may be transferred overall to the second user, the amount of data that may be transferred by each user to the second user, when users can transfer entities to the second user (e.g., only when chatting with the second user, any time the second user is online, etc.), the type of entity that may be transferred (e.g., videos may not be transferred but links may be transferred), etc. Any method known to those of ordinary skill in the art may be used to determine the second user's wishes and provide the first user with the second user's wishes. Returning to block 64, if the second user does not accept the transfer then routine 60 completes.

On the other hand, if the second user accepts the transfer of the entity, block 64 passes control to block 66 to determine whether the second user already has the entity. It may be the case that the first user previously shared the entity with a third user and the third user already shared the same entity with the second user, or the first user may have previously shared the same entity with the second user. Thus, there may no longer be a need to share the same entity with the second user again. If the second user already has the entity, then routine 60 completes.

On the other hand, if not, then control passes to block 68 to initiate the transfer of the entity. As noted above, the instant messaging system being used by the first user and second user may incorporate a client-server based system or a peer-to-peer based system. Thus, block 70 determines whether the transfer will be over a server, e.g., central server, which may indicate that a client-server system is used. The user may be prompted to indicate whether a central server will be used or the determination may be automatically made by the instant messaging system.

If a central server will be used to share the entity, then the entity is transferred to the central server in block 72 and the first and second users are granted access to the entity, and links to the entity are placed on their systems in block 74. Next, control passes to block 76 where a display representation of an icon representing the shared entity or any other indication is displayed in the display representation of the second user's buddy list under the first user's name to indicate that the entity was shared by the first user and is accessible to the second user.

The icon may indicate the type of the shared entity and resemble an email, a chart, etc. Keywords from the entities may also be displayed with the icon to facilitate recognition of the shared entity. The fact that the entity is accessible to the second user may be indicated by the presence of the icon in the display representation of the second user's buddy list. However, the accessibility of the entity may be displayed in the display representation of the buddy list by other means, for example, by highlighting an icon to represent that the shared entity is accessible. Furthermore, the icon may be placed underneath the first user's buddy list name on the second user's buddy list to indicate an association with the first user. Generally, this may have the effect of indicating that the first user shared the entity with the second user. However, the icon does not necessarily need to be displayed below a name (e.g., first user's name) in the buddy list in some embodiments to indicate an association. Additionally, an entity shared by the first user with the second user may be displayed differently than an entity shared by the second user with the first user under the first user's name in the display representation of the second user's buddy list (and under the second user's name in the display representation of the first user's buddy list).

Returning back to block 70, if a central server is not used then a peer-to-peer system may be used and control passes to block 78. Block 78 determines if a peer-to-peer system is used, if not, then routine 60 completes. If so, then block 80 transfers the entity to the second user's computer. Next, control passes to block 76 where a display representation of an icon or other indication representing the shared entity is displayed in the display representation of the second user's buddy list to indicate that the shared entity is accessible to the second user and shared by the first user, which may be indicated by displaying the icon below the first user's name in the display representation of the second user's buddy list.

While routine 60 may terminate upon completion of block 76, in some embodiments it may be desirable to thereafter enable a users to organize and display their buddy list based upon the shared entities instead of user names, and/or to initiate a chat in response to selecting a shared entity, both of which are illustrated in blocks 170-180. In some embodiments, the buddy list may be organized by shared entity in lieu of by user names, and as such block 76 may be omitted.

As shown in block 170, the second user (as well as the first user) may select an option to sort their buddy list into groups using the shared entity. Next, in block 172, the buddy list is sorted by shared entities and may be displayed in block 173. As an example, the names of each user on the buddy list with whom an entity has been shared with or whom has shared the entity may be displayed under the icon of the entity in a display representation of the buddy list. The second user can toggle between this group display and the user name display and/or groups that he or she may manually set up.

Additionally, it may be desirable in some embodiments to permit a chat to be initiated with the users having access to the shared entity. Thus, as shown in block 174, the second user may highlight and/or click on the icon of the shared entity in his or her buddy list and a chat may be initiated in block 176 among the users having access to the shared entity. For example, a chat may be initiated between the first user and the second user when the second user highlights the icon of the entity shared by the first user in block 80. Additionally, rather than just initiating a chat with the user that the shared entity is listed under (e.g., with the buddy list organization of block 76), the user may also be given an option to start a chat with everyone with whom the entity has been shared. For example, the instant messaging client associated with the second user may automatically determine a list of all users from the buddy list of the second user with whom the entity has been shared with and initiates a chat with them. Similarly, had the second user shared the entity, a chat can be initiated with everyone whom the second user shared the entity with. Nonetheless, under the organization of the buddy list of block 76 or the organization of the buddy list of block 170, a chat may be initiated with the users having access to the shared entity. For example, if the entity has been shared with a third and a fourth user, then the chat may be initiated among the first, second, third, and fourth users. The chat may also be initiated with less than all users (e.g., a user is not online).

In addition, the subject of the chat may be generated from the shared entity in some embodiments consistent with the invention. As shown in block 178, the chat that is initiated in block 176 may be displayed to the participants in block 180 with the name of the shared entity set as the subject of the chat, whereby routine 60 is then complete. Thus, when a user initiates a chat by clicking on the icon of a particular shared entity in his or her buddy list, the chat may be displayed to the users with the name of the shared entity as the subject. This may assist a user in determining whether or not to accept the chat and begin chatting.

At least a portion of routine 60 may be used every time an entity is shared with another via instant messaging. Additionally, those of ordinary skill in the art may appreciate that the scope of the invention should not be limited to a first user and a second user, thus, there may be a third user, fourth user, etc. sharing entities. Furthermore, once an entity is shared with a user, the user can manually sort and/or search for the shared entity by type and/or keyword(s). Moreover, a shared entity may be persistent within the user's instant messaging client even when the shared entity's location on the disk changes.

Turning now to FIG. 4, buddy list 82 is one exemplary depiction of a buddy list capable of being generated consistent with routine 60. In response to a first user (i.e., Zachary A. Garbow) sharing an entity with a second user (i.e., Misky Hillestad), for example, by routine 60 of FIG. 3, a display representation of the shared entity may be displayed in a display representation of the buddy list of the second user and may indicate to the second user that the entity is accessible and that entity is associated with the first user.

In particular, buddy list 82 may be displayed for the second user and entity 84 is an entity that the first user has shared with the second user. Furthermore, entity 86 may be an entity that the second user shared with the first user. It is worth noting that entities 84 is displayed differently than entities 86 to distinguish entities shared with the second user from entities shared by the second user. Nonetheless, by the placement of entities 84 and 86 under the first user's buddy list name, it may illustrate that the entities were either shared by the first user or shared with the first user. Additionally, because entities are not listed underneath the other names in buddy list 82, this may indicate that the second user has not shared any entities with them and they have not shared any entities with the second user. Those of ordinary skill in the art may appreciate that entity 84, entity 86, as well as any portion of buddy list 82 may be displayed in any number of different ways consistent with the invention. Additionally, the asterisks displayed along with shared entities SUBJECT: CLUSTER and EMAIL: PATENT APPLICATION STATUS will be discussed hereinbelow in connection with block 186 of FIG. 8.

Turning to FIG. 5, this figure illustrates an alternate display representation of a buddy list of the second user organized by groups based upon the shared entities. As illustrated, buddy list 83 is organized into groups based upon shared entities 84 and 86. In particular, user name 182, the user name of the first user (i.e., Zachary A. Garbow) who shared the entity with the second user, is illustrated underneath shared entities 84 to illustrate that the user represented by the user name has access to the shared entity. Additionally, if any other user had access to the shared entities 84 and 86, the user names may be displayed under those shared entities as well.

If the second user wants to participate in a chat, the second user may highlight and click, for example, the icon of shared entity 84 entitled IM ENTITY SHARING FLOWCHART and a chat, such as chat 188 illustrated in FIG. 6, may be initiated with the first user (as well as any other users having access to the shared entity) and the second user. The first user 182 and the second user 184 participating in the chat may be displayed with the chat as illustrated to the right of chat 188. Additionally, the subject of the chat 186 may be set to IM ENTITY SHARING FLOWCHART because the second user clicked on the shared entity 84 with that wording to initiate the chat. Once chat 188 is displayed for users 182 and 184, the users may type the text of the instant messages they wish to communicate with each other in the spaces illustrated as "type". Those of ordinary skill in the art may appreciate that buddy list 83 and chat 188 may be displayed in any number of different ways consistent with the invention.

Figure 7:
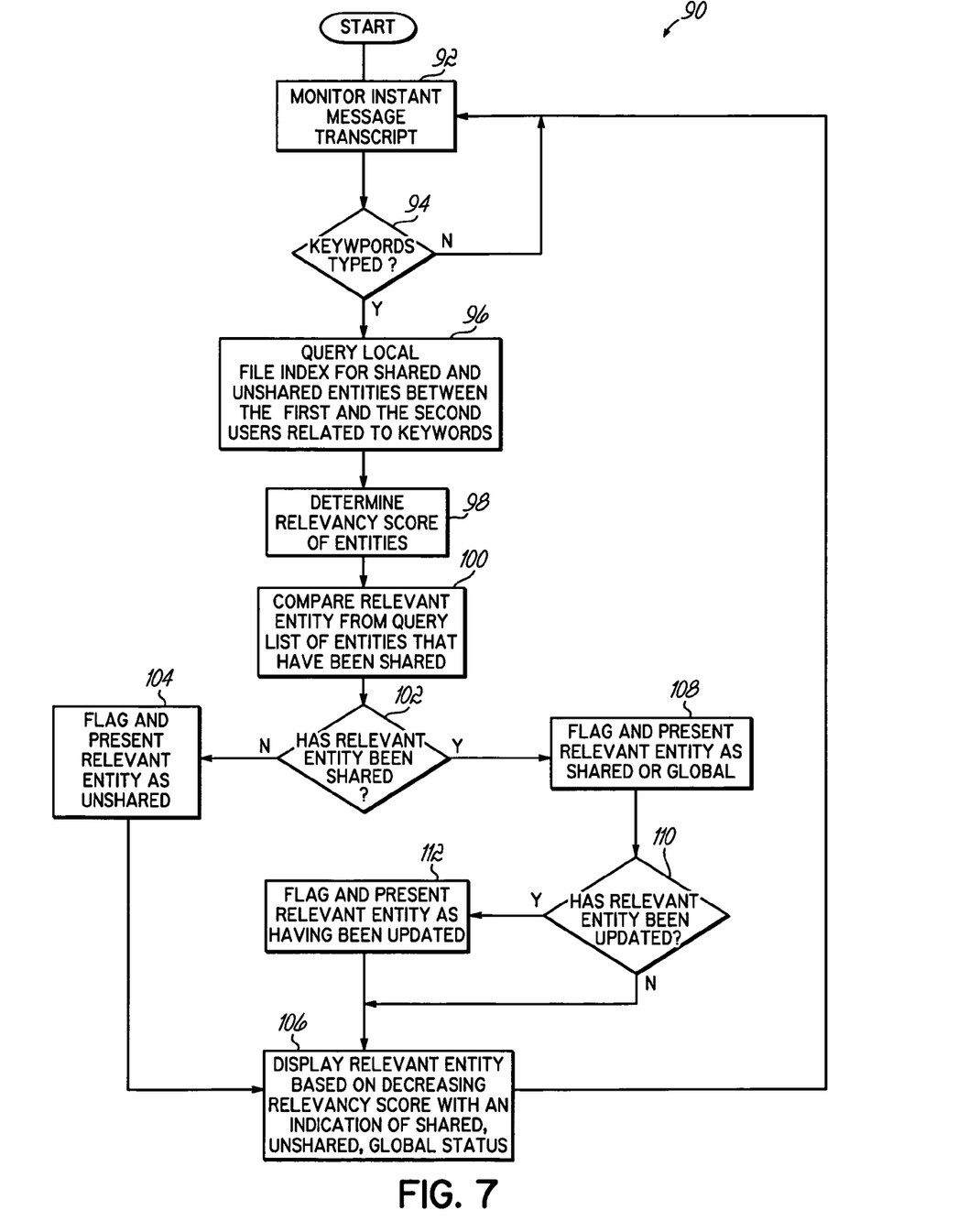
FIG. 7 is a flowchart of a relevant entity identifying routine executed by the instant messaging system of FIG. 1.
Figure 8:
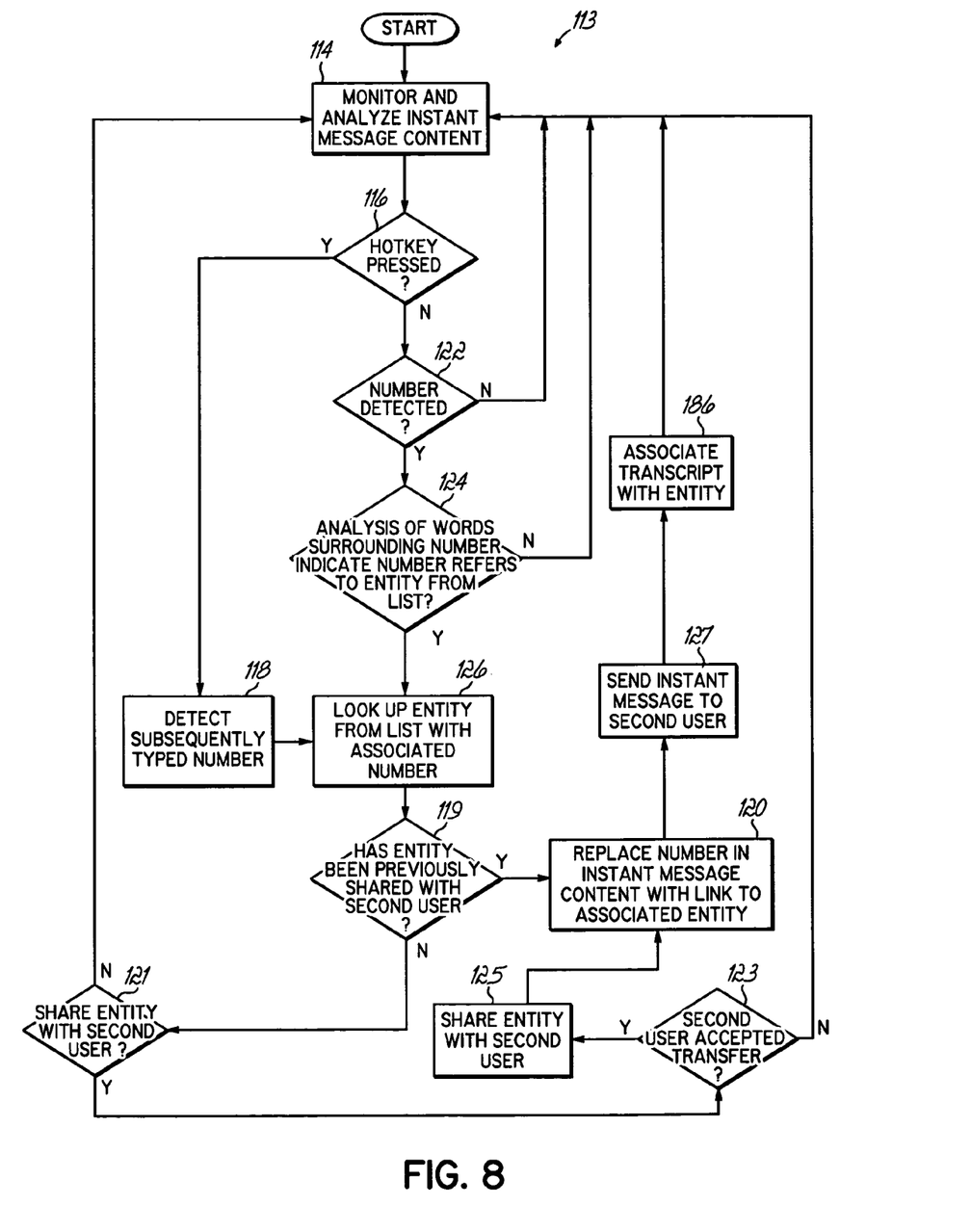
FIG. 8 is a flowchart of an entity referencing routine executed by the instant messaging system of FIG. 1.
Figure 9:
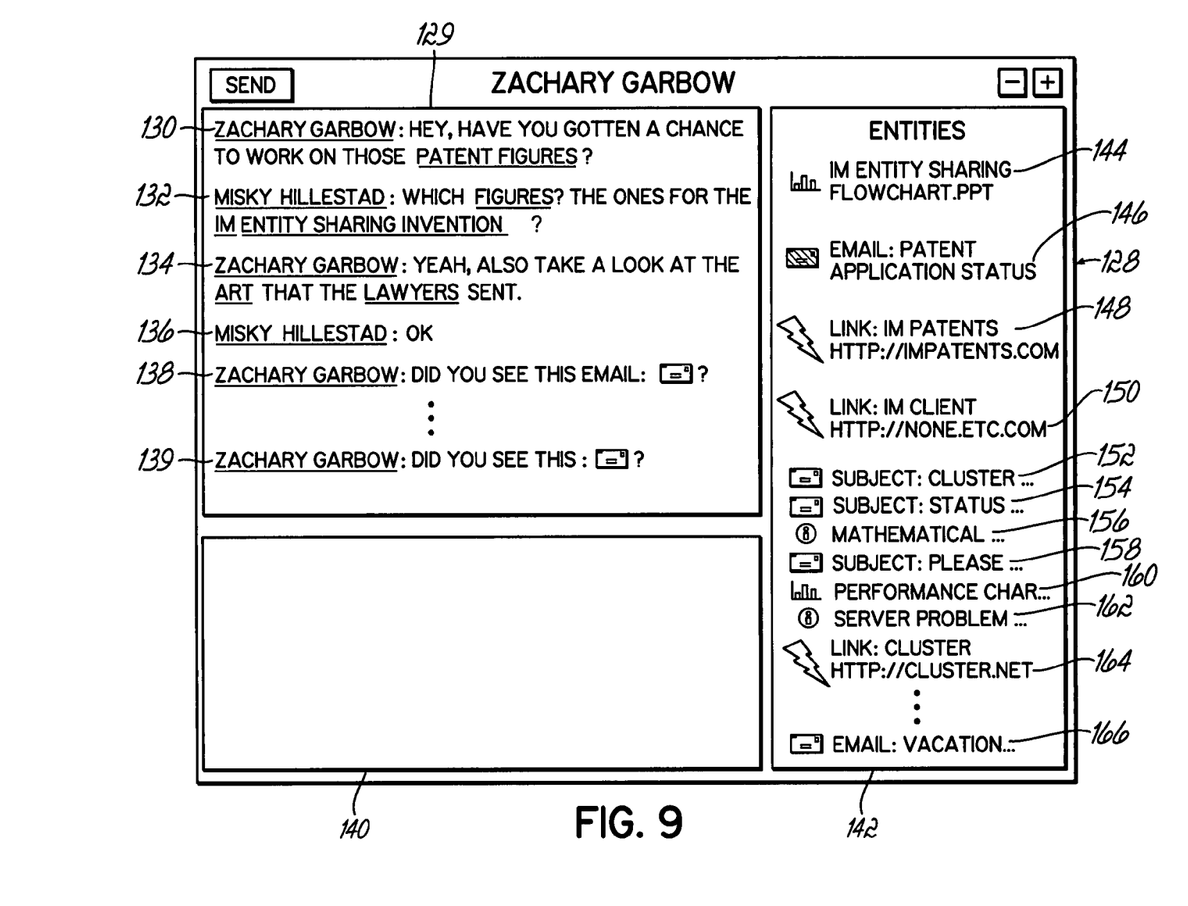
FIG. 9 is a block diagram of an exemplary instant messaging window illustrating the operation of the routines of FIGS. 7-8.

Turning now to FIGS. 7-9, FIG. 7 illustrates an exemplary relevant entity identifying routine 90 consistent with the invention and FIG. 8 illustrates an exemplary entity referencing routine 113 consistent with the invention. FIG. 9 illustrates an exemplary display representation of an instant messaging window to further illustrate the operation of routines 90 and 113.

Turning first to routine 90 in FIG. 7, a loop may be initiated that extends from blocks 92 through 112 that may be used to identify a relevant entity. An entity may be relevant based upon the entity being shared, additionally, in some embodiments, the relevance of each identified relevant shared entity may be further based upon the analysis of at least one instant message of an instant message session (e.g., the entity is related to the content or context of the instant message). Additionally, an entity that has not been shared may be relevant if related to an instant message session (e.g., a user referenced the unshared entity in an instant message of the instant message session, etc.). Generally, routine 90 may continue to run as long as the instant messaging session between a first user and a second user is ongoing. Moreover, routine 90 may run both on the first user's system as well as the second user's system. Routine 90 generally illustrates the routine from the first user's perspective, however, it may be adapted to illustrate the second user's perspective. Additionally, more than two users may be participating in the chat, thus, there may be a third user, a fourth user, etc. However, a first user and a second user are used in routine 90 as well as routine 60 in FIG. 3 and routine 113 in FIG. 8 for simplicity.

In block 92, the instant message transcript (i.e., listing of the communications sent and/or received by the users, also referred to as the content) may be monitored. Any technique known to those of ordinary skill in the art may be used to monitor the transcript. The monitored instant message transcript may then be analyzed to generate a plurality of entities and identify at least one relevant entity from the plurality of entities. For instance, the instant message transcript may be monitored and analyzed for keywords, phrases, tones, semantics, etc. Accordingly, block 94 determines if any keywords were typed by either the first user or the second user. A keyword may be any term, including numbers, that may assist in analysis. Some terms may be more helpful than others, for example, the terms "a" and "the" are very common and may not be as helpful in analysis as compared to the terms "patent" or "experiment", which may not be as frequently used. However, if a keyword was not typed, then control returns to block 92 to continue monitoring the transcript.

On the other hand, if at least one keyword was typed, then control passes to block 96. In block 96, a local file index (e.g., referencing a user's inbox, a user's file system, etc.) or any plurality of entities may be queried to identify entities that are shared and unshared between the parties that is related to the keywords. The local file index or any plurality of entities may include entities that were shared by the first user with the second user or vice versa as well as entities that have not yet been shared with the second user. A shared entity may be one that both the first user and the second user have access to (e.g., via routine 60 in FIG. 3) whereas a nonshared entity may be one that both the first user and the second user do not have access to. Unshared entities may be identified by the techniques discussed hereinbelow in connection with block 98.

Next, block 98 determines a relevancy score for the shared and for unshared entities that are related to the instant message via keywords. Entities may vary on relevancy, for example, an entity that has been shared between the first user and the second user and includes many keywords found in an instant message of the instant message session may be more relevant that an entity that has been shared but only has a small number of keywords found in the instant message. In particular, when multiple shared entities are identified, the relevancy may further be refined by their connection with at least one instant message of the instant message session. The instant message may be analyzed by any means known to those of ordinary skill in the art. For example, in addition to keywords, the local file index may also be queried for entities that are connected to the instant message by using references in the instant message of an entity type, using a date of an entity, using a time of an entity, using communication history between the first user and the second user, etc. as well as entities connected to a participant of the chat that have not been shared. Furthermore, the local file index can be queried for entities related to the instant message by comparing the local file index to the instant message for at least one of a phrase, a tone, or a semantic. In additional to determine the relevancy of multiple relevant shared entities, these techniques may also be used to identify relevant unshared entities and determine the relevancy of multiple relevant unshared entities, including their relevancy in relation to relevant shared entities.

Nonetheless, a relevancy score may be generated for each relevant entity in block 98 and the score may be used to sort the entities related to the instant message session. Any technique known to those of ordinary skill of the art may be used. Furthermore, the score may be a number, a percentage, etc. and the same relevancy score may be generated for more than one entity.

Next, the relevant entity or entities from the query are compared to the list of entities that have been shared in block 100. In particular, a user may have already shared entities using routine 60 in FIG. 3, thus, whether or not a relevant entity has been shared is determined in block 102. If the relevant entity has not been shared by the first user or if the first user shared the relevant entity with less than all the participants of the chat, the relevant entity may be flagged and presented (e.g., via a prompt) to the first user as unshared in block 104. Thus, this may indicate to the first user that there is an entity that is related to the instant message session (e.g., to the content of an instant message), but has not been shared (or has not been shared with all the participants of the chat). Based on this notification, the first user may choose to share and make the relevant entity accessible to the second user, e.g., via routine 60 in FIG. 3. As an example, in a chat with more than two participants such as one with four participants, the first user may have previously shared an entity with the second user but not the third nor the fourth user. Thus, the relevant entity may similarly be flagged and the first user may learn from his buddy list (e.g., as illustrated in FIG. 4) or an automated indication may be displayed to the first user that the relevant entity has not been shared with the third user nor the fourth user and may share it with all the chat participants (e.g., third user and fourth user) or select which participants the relevant entity should be shared with (e.g., the third user but not the fourth user).

Next, the relevant entity or entities may be displayed based on their decreasing relevancy scores in block 106 and monitoring of the instant messaging transcript may resume in block 92. In block 106, the entities that are related to keywords of the instant message transcript or more generally related to the instant message may be displayed and sorted by decreasing relevancy score as a way to highlight the display representation of the relevant entity to indicate that the entity is related to the instant message session. Additionally, each entity may be displayed with an indication of shared or unshared. Additionally, a more specific access status may be displayed, for example, the status of global for entities that have been shared by the first user with the second user that are inherently accessible on the internet such as links and some images.

Nonetheless, all the relevant entities or less than all the related entities (e.g., the display representation of the most relevant ones) may be highlighted and displayed. Furthermore, a relevant entity or entities may be displayed with entities that are not relevant. For example, they may be displayed in a list of entities the first user has shared with any user, thus, the display representation of relevant entity or entities may be highlighted in the display representation of all the entities the first user has shared, including shared entities not related to the instant message by keyword or other means.

The relevant entity or entities may be highlighted by applying at least one of a single color, multiple colors, oscillating color, shading, a pattern, a font, a font size, a style, an animation, an outline, fading, etc. The relevant entity or entities may be highlighted by displaying the display representation of the relevant entity in the display representation of the instant message session, displaying the display representation of the relevant entity adjacent to the display representation of the instant message session, displaying the display representation of the relevant entity in a display representation of a plurality of entities (e.g., the first user's inbox), displaying the display representation of the relevant entity in a display representation of a plurality of entities wherein the plurality of entities are sorted, removing an entity that is not as relevant from a display representation of a plurality of entities (e.g., hiding entities not as relevant from view but the entities may remain in their storage location on the user's system), fading out a less relevant entity from a display representation of a plurality of entities, etc. Nonetheless, block 106 generally displays the display representation of a relevant entity in a display representation of a plurality of entities wherein the plurality of entities are sorted by relevancy and related to the instant message session. However, other techniques may be used to highlight the display representation of a relevant entity or relevant entities. Furthermore, users may set their preferences to indicate how a relevant entity should be highlighted (e.g., from the listing hereinabove) as well as which relevant entities are highlighted (e.g., most recent relevant entities should be highlighted, top N relevant entities (e.g., top 10), only relevant entities that are completely shared with all chat participants, etc.).

Additionally, those of ordinary skill may appreciate that the display representation of a relevant entity and/or relevant entities may be restricted to displaying and highlighting for participants that have access to the relevant entity. For example, if a relevant entity has not been shared with any other user, than the display representation of the relevant entity may be highlighted and displayed for the only user having access to it, e.g., the first user. Furthermore, an indication that the relevant entity has not been shared may be displayed and perhaps an indication of whom the relevant entity has not been shared with and/or whom the relevant entity has been shared with (e.g., a user not part of the chat) may be determined by the first user from his or her buddy list and/or may be displayed automatically to the first user.

Returning to block 102, if the relevant entity has been shared then control passes to block 108. In block 108, the relevant entity is flagged and the entity is presented as shared or global. Additionally, a relevant entity may be shared with less than all the participants of the instant message. As an example, in a chat with four participants, the first user may have previously shared an relevant entity with the second user but not the third user nor the fourth user, thus, the relevant entity may similarly be flagged and the first user may learn from his buddy list (e.g., as illustrated in FIG. 4) or via an automated display that the relevant entity has not been shared with the third user and the fourth user and may chose to share it with all participants or select which participants to share the relevant entity with. In some embodiments, this partial sharing scenario may be associated with either block 104 or block 108, but is described in connection with both blocks.

Next, block 110 determines whether the entity has been updated since the relevant entity was shared. If it has not been changed, then control passes to block 106 to use the relevancy score to display and highlight the display representation of the relevant entity or entities. If a relevant entity has been updated, the relevant entity may be flagged and presented to the user as having been updated in block 112. Thus, the user may request the updated relevant entity and/or the updated entity may be made accessible to those having an older version of the relevant entity. Next, control passes to block 106 to display and highlight the display representation of the relevant entity or entities based upon decreasing relevancy scores. Additionally the access status of the relevant entity may be displayed (e.g., shared, global, unshared, etc.). Those of ordinary skill in the art may appreciate that instant messaging will generally be more synchronized because a display representations of relevant shared entities may be automatically highlighted to users having access to the relevant shared entities and additionally, relevant unshared entities may be identified and shared with users that do not have access to the relevant entity.

Turning now to FIG. 8, routine 113 illustrates an exemplary routine for referencing entities, including shared and/or unshared entities, and associating a transcript of a chat with a referenced entity. Generally, the participants of an instant message session may want to reference a specific entity (e.g., a relevant shared or unshared entity that may be displayed to the user by routine 90 in FIG. 7). For instance, in an instant message session between the first user and the second user sharing twenty entities with each other, the first user may want to tell the second user to look at the fifth entity. Thus, routine 113 may be used as a short hand for referencing entities.

Similar to routine 90 in FIG. 7, a loop may be initiated in routine 113 that extends from blocks 114 through 127 and block 186. Generally, routine 113 may continue to run as long as instant messaging between a first user and a second user is ongoing (i.e., an instant message session). Moreover, routine 113 may run both on the first user's system as well as the second user's system. Routine 113 generally illustrates the routine from the first user's perspective, however, it may be adapted to illustrate the second user's perspective, third user's perspective, etc.

Turning to block 114, the contents of an instant message may be monitored and analyzed in block 114. In particular, once an instant message of the instant message session has been processed by routine 113, then the next instant message of the instant message session may be monitored and analyzed in block 114. Next, block 116 determines whether or not a hotkey was pressed by the first user typing the instant message. A hotkey may be practically any key or set of keys that a user may type which has a predefined meaning. The pound symbol (#) may be a hotkey since a user may likely reference an entity by the numerical position of the entity in a list, e.g., a list of relevant shared entities. Next, block 118 determines if the hotkey was followed by a number, if so, then block 126 looks up the entity associated with the number and then block 119 determines whether the entity has been previously shared with the second user. If so, such as by routine 60 of FIG. 3, then the number typed by the first user as well as the hotkey is replaced with a link associated with the entity the user referenced. In particular, the first user may type the following statement to the second user "Did you get a chance to check out #5?" and the statement may be displayed with an icon instead of "#5" on the second user's system and in the transcript. In some embodiments, a keyword associated with an entity may also be used by the first user to reference an entity instead of or in conjunction with a hotkey and/or a number. Next, the instant message may be sent to the second user in block 127.

Additionally, in block 186, at least a portion of the transcript of the current instant message session may be associated with the entity referenced by the first user. For example, the whole transcript may be associated with the entity or just a portion of the transcript of the instant message such as the current instant message and subsequent instant messages sent after this one until the first user and/or second user references a different entity. If the first user references another entity, then that instant message and instant messages subsequent to that instant message may be associated with the other referenced entity or the whole transcript may be associated with that other referenced entity as well. The transcript may be associated for the first user and/or the second user. In associating the transcript with the referenced entity, the transcript may be saved and an indication such as an asterisk may be placed with the entity on the first user's buddy list (e.g., as illustrated in the buddy list of FIG. 4 or FIG. 5) to indicate that a transcript of an instant message session has been associated with that entity and distinguish the entity from entities for which transcripts have not been associated. Additionally, the transcript associated with the entity may be displayed, for example, when the first user and/or the second user click upon the icon of the entity on the their buddy list (e.g., a right click on the icon of a shared entity in a buddy list as indicated in FIG. 4 with an asterisk). In some embodiments, transcripts may be associated with unshared entities referenced in the instant message session as well and/or transcripts may be displayed by clicking, for example, on a display representation of a referenced shared and/or unshared entity not in a buddy list. Furthermore, additional transcripts or portions of transcripts of other instant message sessions may also be associated with the entity (e.g., transcripts of instant message sessions with the second user that reference the entity). Next, control passes to block 114 to continue to monitor and analyze the contents of the instant message.

On the other hand, if the entity referenced by the user has not been previously shared, then the first user may be asked (e.g., via a prompt) whether he or she wants to share the entity in block 121, if not, then control passes to block 114 to continue to monitor the instant message. If the first user wants to share the entity with the second user, then the second user may be asked whether he or she wants to accept the transfer of the entity in block 123. For example, the second user may not have enough resources on his or her system to store a large entity and may reject the transfer. If the second user does not accept the transfer, control passes to block 114 to continue to monitor and analyze the contents of the instant message.

However, if the second user does accept the transfer, then the entity may be shared with the second user in block 125, the number in the instant message replaced with a link to the entity in block 120, the instant message sent in block 127, and the transcript may be associated with the entity in block 186. Next, control passes to block 114 to continue to monitor and analyze the contents of the instant message.

Returning to block 116, if a hotkey was not pressed then control passes to block 122 to determine if a number was detected. If not, then control returns to block 114 to resume monitoring and analyzing the instant message. If a number was detected, because a number may be part of a calculation, an equation, etc., block 124 determines if an analysis of the text surrounding the detected number indicates that the number references a shared or unshared entity (e.g., from a plurality of entities or list of entities). If the analysis does not indicate such, then control returns to block 114, however, if it does, then the entity associated with the number is looked up in the list in block 126. Next, as generally described above, control may pass to blocks 119, 121, 123, 125, 120, 127, and 186. Ultimately, control returns to block 114 to continue to monitor and analyze the contents of the instant message.

Turning now to FIG. 9, instant messaging window 128 is one example of a display representation of instant messaging window that incorporates the identification of relevant shared entities and/or relevant unshared entities, referencing shared and/or unshared entities, and association of transcripts with shared and/or unshared entities consistent with the invention. In particular, list 142 and transcript of area 129 may be displayed for a user consistent with the invention but not necessarily as shown in instant messaging window 128.

In the current example, instant messaging window 128 may be displayed for a first user (i.e., Garbow). In particular, on the left side of instant messaging window 128 are instant messages 130-139, constituting the transcript of instant messaging window 128, that may have been sent and/or received by the first user and a second user (i.e., Hillestad) during the instant message session. Below instant messages 130-139 is an area 140 where the first user may type an additional instant message to the second user and the additional instant message may be displayed. On the right is a list of relevant shared entities that may have been identified by routine 90. The entities may have been shared by the first user with the second user or shared by the second user with the first user. Additionally, some relevant entities may be unshared such as entity 146 and the first user may be presented with the opportunity to share it with the second user when he or she references entity 146 in instant message 139 (discussed in more detail hereinbelow). Additionally, one or more of instant messages 130-139 in the transcript in area 129 may be analyzed to determine the relevancy of each relevant entity to display the relevant entities by reverse relevancy scores. Thus, the most relevant entities may be displayed towards the top.

Initially, entities 144 and 148-166 may be deemed relevant from a plurality of entities from the first user's local file index because they are shared between the first and the second users and displayed to the first user. Next, starting with instant message 130, an analysis of the instant message 130 may lead to a further refinement of the relevancy of each relevant shared entity as well as a the identification of relevant unshared entities (e.g., entity 146 illustrated by shading). In particular, the keywords from the first message like patent and/or figures (illustrated with underlining) may be compared with the text of entities from the first user's local file index (e.g., plurality of entities from the first user's inbox, file system, etc.). As a result, it may be determined that entities 144, 146, 148, and 150 contain both keywords from instant message 130 whereas entities 152-166 are also related to the content of instant message 130 (e.g., each of entities 152-166 either mentions patent or figure, etc.). Nonetheless, a relevancy score may be generated for each of these relevant entities (i.e., entities 144-166) and if the second user does not have access to any of the entities, such as entity 146 (illustrated by the shading of the icon), the first user may be notified when he or she references the entity in instant message 139 and can share the unshared entity with the second user (e.g., by routine 60 in FIG. 3).

Nonetheless, the relevant entities may be displayed and highlighted for the first user based upon their reverse relevancy score. Thus, the display representation of the more relevant entities 144, 146, 148, and 150 may be highlighted by sorting the list as illustrated and placing these entities on the top (or fading out entities 152-166 which are less relevant, etc.) to indicate that these are the most relevant entities from the larger list of relevant entities that are related to instant message 130.

Similarly, an instant messaging window such as instant messaging window 128 may be displayed with entities 144, 148, and 150 for the second user, but not relevant entity 146 until the first user shares it with the second user. Additionally, had the second user updated or modified entity 144, 148, and/or 150, the first user may have been notified of the update.

It is worth noting that the entities that are most relevant may change each time a new instant message is sent and/or received by the users as the relevancy of the multiple relevant entities may be refined. Thus, list 142 may be sorted differently after instant message 132 and sorted differently after 134. For example, after instant message 134 is sent by the first user to the second user, entities 148 and 150 may be more relevant than entities 144, 146, and 152-166, thus the display representation of entities 148 and 150 may be highlighted by resorting list 142 and placing them at the top of list 142. Instant message 136 may not cause list 142 to be resorted. Furthermore, the number of relevant entities may change with each instant message. For example, more entities may be added to the list of relevant entities as the instant message conversation progresses (e.g., unshared relevant entities). For example, entity 166 may not be as relevant until instant message 138 has been sent by the first user to the second user. Thus, entity 166 may not be highlighted to the first user prior to instant message 138.

It is worth noting that list 142 is illustrated as a list consisting of relevant entities but list 142 may contain irrelevant entities (e.g., entities not shared and not related to the instant message session). As described hereinabove, a display representation of a relevant entity may be highlighted in any manner known to those of ordinary skill in the art including highlighting the display representation of the relevant entity in a display representation of any plurality of entities.

Additionally, in connection with instant message 138, the first user may type "Did you see this email: #5?" in area 152 and since the entity has already been previously shared with the second user based on the fact that the display representation of entity 152 is not shaded, the hotkey and number reference may be replaced with a link to entity 152 and then the instant message may be sent to the second user with the link, assuming list 142 is sorted as illustrated in instant messaging window 128. Thus, the first user is using a hotkey and a number to reference entity 152 in the chat. Upon sending the text, the text may be display as instant message 138. Furthermore, list 142 may be resorted such that entity 152 is allocated the highest relevancy score and placed at the top of list 142. Additionally, the display representation of other relevant entities to instant message 138 may be highlighted by being placed towards the top of the list below entity 152.

However, in some embodiments, when a participant of the chat references an entity, the referenced entity need not to be deemed the most relevant entity and/or the display representation of the referenced entity does not need to be highlighted. Additionally, if the first user references an entity that has not been previously shared by the first user with the second user, then the first user could have been prompted and allowed to share it. For example, the first user may similarly type "Did you see this email #2?". Thus, because entity 246 has not been shared, the first user may be prompted to share it with the second user, if he or she agrees and the second user agrees to accept the transfer, then entity 146 may be shared. Furthermore, the hotkey and the number may be replaced with a link to entity 146 and it may be displayed as instant message 139 when the instant message is sent. Furthermore, because the first user shared entity 146 with the second user, entity 146 may be illustrated in the buddy list of the second user as depicted in buddy list 82 and 83 of FIGS. 4 and 5, respectively.

Transcript of area 129 may also be associated with entity 152 and 146. In particular, as the first user referenced entity 152, the whole transcript may be associated with entity 152 or only a portion of the transcript may be associated, such as instant message 138 and onwards. An indication of the association may be illustrated as depicted by the asterisk in buddy list 82 of FIG. 4 and buddy list 83 of FIG. 5. Similarly, an indication of the association of the transcript or portion of the transcript may be displayed for entity 146 as illustrated in buddy list 82 and 83.

Various modifications may be made to the illustrated embodiments without departing from the spirit and scope of the invention. Therefore, the invention lies in the claims hereinafter appended.

What is claimed is:

1. A method of processing an instant message session between a first user and a second user in an instant messaging system, the method comprising:
   identifying at least one relevant entity from among a plurality of entities based upon the relevant entity being shared by the first and second users participating in the instant message session;
   highlighting a display representation of the relevant entity to indicate that the relevant entity is related to the instant message session; and
   displaying a display representation of a second relevant entity that has not been previously shared by the first user with the second user, wherein highlighting the display representation of the first relevant entity includes indicating a shared status for the first relevant entity.

2. The method of claim 1, wherein the relevant entity is selected from the group consisting of a file, an image, a video, an e-mail, a link, a bookmark, a database, and a least a portion of a transcript of another instant message session.

3. The method of claim 1, further comprising:
   analyzing an instant message from the first user to the second user to identify a reference in the instant message to the second relevant entity;
   determining that the second relevant entity has not been previously shared by the first user with the second user; and
   initiating sharing of the second relevant entity by the first user with the second user.

4. The method of claim 3, wherein initiating sharing of the second relevant entity is responsive to receiving permission to share the second relevant entity provided by at least one of the first or second users.

5. The method of claim 1, wherein identifying the at least one relevant entity includes identifying multiple relevant entities, the method further comprising analyzing the instant message to determine the relevance of each of the multiple relevant entities.

6. The method of claim 1, wherein highlighting the display representation of the relevant entity to indicate that the relevant entity is related to the instant message session includes at least one of displaying the display representation of the relevant entity in the display representation of the instant message session, displaying the display representation of the relevant entity adjacent to the display representation of the instant message session, displaying the display representation of the relevant entity in a display representation of a plurality of entities, displaying the display representation of the relevant entity in a display representation of a plurality of entities wherein the plurality of entities are sorted, removing an entity that is not as relevant from a display representation of a plurality of entities, or fading out a less relevant entity from a display representation of a plurality entities.

7. The method of claim 1, further comprising:
Analyzing an instant message from the first user to the second user to identify a reference in the instant message to a third relevant entity; and
replacing the identified reference in the instant message with a link to the third relevant entity.

8. The method of claim 7, wherein replacing the identified reference with the link is performed prior to communicating the instant message from the first user to the second user.

9. The method of claim 7, further comprising determining whether the third relevant entity is shared between the first and second users, wherein replacing the identified reference with the link is performed responsive to determining that the third relevant entity has been shared.

10. A method of sharing an entity between a first user and a second user within an instant messaging system, the method comprising:
in response to the first user sharing an entity with the second user via the instant messaging system, displaying a display representation of the shared entity in a display representation of a buddy list of the second user;
indicating to the second user the accessibility of the shared entity and an association of the shared entity with the first user; and
displaying a display representation of a second entity that has not been previously shared by the first user with the second user, wherein indicating to the second user the accessibility of the shared entity and an association of the shared entity with the first user includes indicating a shared status for the shared entity.

11. The method of claim 10, further comprising initiating an instant message session for a plurality of users whom have access to the shared entity responsive to at least one of the second user highlighting the display representation of the shared entity in the display representation of the buddy list of the second user or the first user highlighting a display representation of the shared entity in a display representation of a buddy list of the first user.

12. The method of claim 10, further comprising sorting at least one of the buddy list of the second user or a buddy list of the first user into groups, wherein each group is based upon a shared entity.

13. The method of claim 10, further comprising automatically generating a subject for an instant message session based upon the shared entity.

14. An apparatus, comprising:
a processor;
a memory; and
program code configured to process an instant message session between a first user and a second user in an instant messaging system by identifying at least one relevant entity from among a plurality of entities based upon the relevant entity being shared by the first and second users participating in the instant message session and highlighting a display representation of the relevant entity to indicate that the relevant entity is related to the instant message session, wherein the program code is further configured to display a display representation of a second relevant entity that has not been previously shared by the first user with the second user, wherein the program code is configured to highlight the display representation of the first relevant entity further by indicating a shared status for the first relevant entity.

15. The apparatus of claim 14, wherein the program code is further configured to
analyze an instant message from the first user to the second user to identify a reference in the instant message to the second relevant entity;
determine that the second relevant entity has not been previously shared by the first user with the second user; and
initiate sharing of the second relevant entity by the first user with the second user.

16. The apparatus of claim 15, wherein the program code is further configured to initiate sharing of the second relevant entity responsive to receiving permission to share the second relevant entity provided by at least one of the first or second users.

17. The apparatus of claim 14, wherein the program code is configured to identify the at least one relevant entity further by identifying multiple relevant entities, wherein the program code is further configured to analyze the instant message to determine the relevance of each of the multiple relevant entities.

18. The apparatus of claim 14, wherein the program code is configured to highlight the display representation of the relevant entity to indicate that the relevant entity is related to the instant message session further by at least one of displaying the display representation of the relevant entity in the display representation of the instant message session, displaying the display representation of the relevant entity adjacent to the display representation of the instant message session, displaying the display representation of the relevant entity in a display representation of a plurality of entities, displaying the display representation of the relevant entity in a display representation of a plurality of entities wherein the plurality of entities are sorted, removing an entity that is not as relevant from a display representation of a plurality of entities, or fading out a less relevant entity from a display representation of a plurality entities.

19. The apparatus of claim 14, wherein the program code is further configured to
analyze an instant message from the first user to the second user to identify a reference in the instant message to a third relevant entity; and
replace the identified reference in the instant message with a link to the third relevant entity.

20. The apparatus of claim 19, wherein the program code is further configured to replace the identified reference with the link prior to communicating the instant message from the first user to the second user.

21. The apparatus of claim 19, wherein the program code is further configured to determine whether the third relevant entity is shared between the first and second users, wherein the program code is further configured to replace the identified reference with the link responsive to determining that the third relevant entity has been shared.

22. A program product, comprising:

program code configured to process an instant message session between a first user and a second user in an instant messaging system by identifying at least one relevant entity from among a plurality of entities based upon the relevant entity being shared by the first and second users participating in the instant message session and highlighting a display representation of the relevant entity to indicate that the relevant entity is related to the instant message session; and a computer readable medium bearing the program code, wherein the program code is further configured to display a display representation of a second relevant entity that has not been previously shared by the first user with the second user, wherein the program code is configured to highlight the display representation of the first relevant entity further by indicating a shared status for the first relevant entity.

* * * * *